US 8,214,271 B2
Jul. 3, 2012

(12) United States Patent
Lefebvre et al.

(10) Patent No.: US 8,214,271 B2
(45) Date of Patent: Jul. 3, 2012

(54) SYSTEM AND METHOD FOR ASSIGNING CREDIT TO PROCESS INPUTS

(75) Inventors: W. Curt Lefebvre, Boston, MA (US); Daniel W. Kohn, Cambridge, MA (US)

(73) Assignee: NeuCo, Inc., Boston, MA (US)

( * ) Notice: Subject to any disclaimer, the term of this patent is extended or adjusted under 35 U.S.C. 154(b) by 2139 days.

(21) Appl. No.: 10/771,570

(22) Filed: Feb. 4, 2004

(65) Prior Publication Data

US 2005/0171880 A1   Aug. 4, 2005

(51) Int. Cl.
*G06F 17/60* (2006.01)
(52) U.S. Cl. .............................. 705/35; 700/28; 700/29
(58) Field of Classification Search .................. None
See application file for complete search history.

(56) References Cited

U.S. PATENT DOCUMENTS

| | | | |
|---|---|---|---|
| 4,208,712 A | 6/1980 | Deutsch | 364/105 |
| 4,965,742 A | 10/1990 | Skeirik | |
| 4,985,824 A | 1/1991 | Husseiny et al. | |
| 5,167,009 A | 11/1992 | Skeirik | |
| 5,212,765 A | 5/1993 | Skeirik | |
| 5,224,203 A | 6/1993 | Skeirik | |
| 5,282,261 A | 1/1994 | Skeirik | |
| 5,353,207 A | 10/1994 | Keeler et al. | 364/164 |
| 5,386,373 A | 1/1995 | Keeler | |
| 5,444,819 A * | 8/1995 | Negishi | 706/21 |
| 5,471,381 A | 11/1995 | Khan | |
| 5,493,631 A | 2/1996 | Huang et al. | |
| 5,621,863 A * | 4/1997 | Boulet et al. | 706/26 |
| 5,704,011 A * | 12/1997 | Hansen et al. | 706/25 |
| 5,781,432 A | 7/1998 | Keeler | |
| 5,819,246 A | 10/1998 | Ashida et al. | |
| 5,822,740 A | 10/1998 | Haissig | |
| 5,825,646 A | 10/1998 | Keeler et al. | 364/164 |
| 6,002,839 A | 12/1999 | Keeler | |
| 6,038,540 A | 3/2000 | Krist et al. | |
| 6,063,292 A | 5/2000 | Leung | |
| 6,241,435 B1 | 6/2001 | Huang et al. | |
| 6,278,899 B1 | 8/2001 | Piche et al. | 700/44 |
| 6,325,025 B1 | 12/2001 | Perrone | |

(Continued)

OTHER PUBLICATIONS

Yen, "Optimal Tracking Control in Flexible Pointing STructures" IEEE COnference on Systems, Man and Cybernetics, Intelligent Systems for the 21st Century, 5:4440-4445 (1995).

(Continued)

*Primary Examiner* — Thomas Dixon
*Assistant Examiner* — Gerald Vizvary
(74) *Attorney, Agent, or Firm* — Kusner & Jaffe

(57) ABSTRACT

Various embodiments of the invention are directed to methods and systems for assigning credit to the external and intermediate inputs of an enterprise-level system or other aggregate process with one or more global outputs that is composed of a number of interconnected local processes. Assigning credit is a mechanism for evaluating the impact of a particular variable, e.g., an input to one of the local processes, on the final output of the aggregate process. In certain embodiments of the invention, credit is assigned to the local inputs of each local process in two steps. First, for each local input, a local credit assignment is obtained. For chained outputs, credit assignment data is provided as calculated for the later stage processes to which the outputs are chained. Second, a global credit assignment is derived for the local inputs from the local credit assignment and the credit assignment information from later stage processes.

27 Claims, 11 Drawing Sheets

U.S. PATENT DOCUMENTS

| | | | |
|---|---|---|---|
| 6,381,504 | B1 | 4/2002 | Havener et al. ............ 700/44 |
| 6,423,696 | B1 | 7/2002 | Collins |
| 6,425,352 | B2 | 7/2002 | Perrone |
| 6,532,454 | B1* | 3/2003 | Werbos ............ 706/14 |
| 6,539,343 | B2 | 3/2003 | Zhao et al. |
| 6,583,964 | B1 | 6/2003 | Huang et al. |
| 6,668,201 | B1 | 12/2003 | Bonissone et al. |
| 6,678,585 | B1 | 1/2004 | Havener ............ 700/295 |
| 6,721,606 | B1 | 4/2004 | Kaji et al. |
| 6,725,208 | B1* | 4/2004 | Hartman et al. ............ 706/23 |
| 6,736,089 | B1 | 5/2004 | Lefebvre et al. |
| 6,757,579 | B1 | 6/2004 | Pasadyn |
| 6,823,675 | B2 | 11/2004 | Brunell et al. |
| 2001/0041996 | A1* | 11/2001 | Eder ............ 705/7 |
| 2002/0143693 | A1* | 10/2002 | Soestbergen et al. ............ 705/37 |
| 2003/0109951 | A1 | 6/2003 | Hsiung et al. |
| 2003/0190603 | A1 | 10/2003 | Larder et al. |
| 2003/0195641 | A1 | 10/2003 | Wojsznis et al. |
| 2003/0217021 | A1 | 11/2003 | Jacobson |
| 2004/0133531 | A1 | 7/2004 | Chen et al. |
| 2004/0170441 | A1 | 9/2004 | Forbes et al. |

OTHER PUBLICATIONS

Yen, "Decentralized Neural Controller Design for Space Structural Platforms", IEEE Conference on Systems, Man and Cybernetics, Human Information and Technology, 3:2126-2131 (1994).

Sarunac, N., et al., "Sootblowing Optimization Helps Reduce Emissions from Coal-Fired Utility Boilders," Energy Research Center, Lehigh University, Bethlehem, PA.

Nakoneczny, G., et al., "Implementing B&W's Intelligent Sootblowing System at MidAmerican Energy Company's Louisa Energy Center Unit 1," Western Fuels Conference, Aug. 12-13, 2002, Albuquerque, NM.

Stallings, J., Fifth Intelligent Sootblowing Workshop, Electric Power Research Institute, Jun. 2004, Palo Alto, CA.

Rhode, M., et al., "Tampa Electric's Neutral Network Based Intelligent Sootblowing," $4^{th}$ Intelligent Sootblowing Workshop, Mar. 19-21, 2002.

Anonymous, "Intelligent Sootblowing Demonstration at Texas Glenco's W.A. Parish Plant," Electric Power Research Institute, Dec. 2003.

Anonymous, "Intelligent Sootblowing at TVA's Bull Run Plant," Electric Power Research Institute, Dec. 2003.

Shinskey, F.G., "Controlling Multivariable Processes", Instrument Society of America, 1981.

Shinskey, F.G., "Process Control Systems", McGraw-Hill, 1979.

Piche, et al., "Nonlinear Model Predictive Control Using Neural Network," IEEE Control Systems, pp. 53-62, Jun. 2000.

Hesnon, M. and Seborg, D., "Nonlineary Model Predictive Control," Prentice Hall, 1997.

Chen et al., "Nonlineary Neural Network Internal Model Control with Fuzzy Adjustable Parameter", IEEE International conference on Industrial Technology, 1996.

Lin et al., "Hybrid Adaptive Fuzzy Control Wing Rock Motion System and H Robust Performance", IEEE International conference on Industrial Technology, 2003.

Bishop, C., "Neural Networks for Pattern REcognition," Oxford University Press, 1998, pp. 140-150.

Piche, S., "Steepest Descent Algorithms for Neural Network Controllers and Filters," IEEE Transactions on Neural Networks, vol. 5, No. 2, Mar. 1994, pp. 198-212.

\* cited by examiner

SYSTEM AND METHOD FOR ASSIGNING CREDIT TO PROCESS INPUTS

FIELD OF THE INVENTION

The invention relates to systems and methods for modeling the behavior of a system, control systems and enterprise management.

BACKGROUND OF THE INVENTION

A typical business enterprise can be characterized as a process having a global objective that is an aggregation of distributed, but interconnected local processes. The local processes accomplish tasks that contribute to producing the finished product of the business enterprise. Each local process requires certain local inputs and generates certain local outputs, at least some of which impact the finished product and the global objective. The outputs from certain processes are inputs into other processes. These cascaded input-output relationships define an ordered arrangement of the processes. The output of the terminal process in the chain is the finished product which corresponds to some global objective of the business, an objective that is often financial. One common objective, for example, is maximizing the profit of the enterprise; the corresponding global output of the terminal process in the hierarchy of contributing processes is the actual profit of the enterprise. These processes may be described by a directed graph and may be identified as part of a production flow analysis, company flow analysis or factory flow analysis, for example. These processes may be charted in a material flow network diagram or similar flow chart.

FIG. 1 is a diagram illustrating a system 100 of interconnected nodes, processes p1 and p2, that contribute to the output of a business enterprise with the characteristic process flow discussed above. Process p1 has two inputs x1 and x2 and two outputs y1 and y2. In the illustrated example, inputs x1 and x2 are external inputs to the system 100 that are not output from another process. The inputs x1 and x2 may be, for example, controllable variables that can be set directly by a control system or operator. They may also be variables defined by the external environment in which the enterprise operates. The output y1 is a local output generated by process p1 that does not contribute to the final output. Output y2 is a local output, and, chained as an input to another process, forms an intermediate input to the second process, i.e., one that is not directly controllable. Output y2 is a component of the finished product. At the terminal node, process p2 has two inputs y2, corresponding to the output of p1, and x3, and one output y3. Output y3 is a global output or the finished product of the system 100. The interrelationships between the inputs and outputs of processes define different stages in the process flow, based on the number of processes between a particular input or output and the terminal node. As discussed herein, later stages are more proximate to the terminal node and to the global output, which is the output of the terminal node, than earlier stages.

A large enterprise may be composed of a large number of processes like processes p1 and p2, each of which has complex interconnections with many other processes. These interconnections may define a deeply nested aggregate process with a complex structure. The interconnections between the processes create complex relationships between the external inputs, some of which are controllable, as well as the intermediate inputs, and the global output. As the size of the enterprise increases, it becomes an increasingly difficult problem to trace the relationship between a particular variable and the global output. Each local process is typically designed to optimize its local outputs within parameters or heuristic guidelines that are expected to optimize the global objective based on the individual contribution of that process. The effects of interconnecting all of these processes from a global perspective to produce the final output are typically not well understood or well tested. In many real-world applications, interconnecting such locally optimized processes may yield a solution that is adequate, but processes having local objectives individually selected with a view to satisfying a global objective may not optimize the global objective when functioning in combination. Local optimization may have unintended and even counterproductive effects on the global objective.

The problem may be further compounded because information is not effectively shared throughout a typical enterprise-wide system. Individual processes may be managed by specialized process management software designed to optimize certain local outputs in view of process-specific phenomena and considerations. These processes and the process management software may be distributed across many different systems using different platforms, data formats, etc. Individual processes may be able to take data from other processes into account only to a limited extent. In addition, the enterprise is a dynamic system that functions and varies continuously and is constantly subjected to fluctuations in the external inputs, requiring repeated re-evaluation of the local objectives and local inputs and possibly even redefinition of the local processes.

It is desirable to globally optimize the single objective of the enterprise, taking the inter and intra-process interactions as well as external input fluctuations into account. Accordingly, it is desirable to coordinate between the various processes in the enterprise. It is desirable to have a global view of the contribution of each variable on the finished product and to determine the impact of adjustments to each external and intermediate input on the finished product, especially in real-time.

SUMMARY OF THE INVENTION

Various embodiments of the invention are directed to methods and systems for assigning credit to the external and intermediate inputs of an enterprise-level system or other aggregate process with one or more global outputs that is composed of a number of stages of interconnected local processes. Credit is a metric for measuring the contribution of a particular variable on a component of the system. Credit is also useful for determining the sensitivity of a component to a contributing variable and the impact of adjusting that variable. Assigning credit is a mechanism for evaluating the impact of a particular variable, e.g., an input to one of the local processes, on the final output of the aggregate process.

In certain embodiments of the invention, credit is assigned to the local inputs of each local process in two steps. First, for each local input, a local credit assignment is obtained. Second, a global credit assignment is derived for the local inputs from the local credit assignment and credit assignment information from later stage processes. The credit assignment information from later-stage processes includes the credit assignments for the chained outputs (of an earlier-stage process) as calculated for the later-stage processes to which the outputs are chained.

Credit assignment information generated for later-stage processes can be applied, i.e., backpropagated, to earlier-stage processes. Credit is assigned throughout the hierarchy by beginning with the terminal node at the final stage and iterating through the hierarchy of processes from later stages to earlier stages.

Certain embodiments use the chain rule for ordered partial derivatives together with credit assignment information from later stages for assigning credit to the local inputs of a particular process. In certain embodiments, each local process has a corresponding first-order differentiable representation. Beginning with the terminal process, an initial step involves obtaining the partial derivative of the system's objective function with respect to each of the inputs to the top-most process. The results for inputs that are intermediate inputs, i.e., outputs of a preceding local process, are then backpropagated to the earlier preceding local process and used to obtain the partial derivative of the global output of the system with respect to each of the inputs to the earlier-stage process by applying the chain rule. In certain embodiments, this procedure is repeated in order to generate credit assignment functions for all of the local inputs distributed throughout the system.

In certain embodiments, each local process is typically operated by a process management module. The process management module includes a service that calculates the credit assignment of at least one of its inputs with respect to at least one later-stage output, which may be one of the global outputs. In certain contemplated embodiments, the process management module uses a model of the process, e.g., a neural network model or a first principles model, and credit assignments of its chained local outputs with respect to the desired later-stage output to calculate the credit assignments of its inputs. Recalculation of credit assignments may be timed or may be event-driven. For example, the credit assignments can be recalculated periodically or when new real-time operating data is received. The credit assignment can be used as an indication of the sensitivity of the global output to changes in the local input in real-time under a current set of operating conditions. In certain embodiments, process management modules can calculate global credit assignments for inputs of processes managed by other process management modules, using data provided by the respective process management modules.

The process management module can pass local or global credit assignments to other process management modules. Credit assignments may change when the operating region of the system changes or when a local model for a process changes, e.g., through adaptation. The local process management modules are typically implemented in a distributed computing environment. Standard application program interfaces (APIs) allow the various local process management modules to communicate with each other and with an enterprise-level manager. Multiple hierarchies can also be linked using the system and method of the present invention.

An enterprise management interface or local process management interfaces can display the credit of and/or sensitivity of the output with respect to a particular local input for use by local or enterprise-level operators. A local or enterprise-stage manager can use the credit assignment information to optimize the global process, e.g., to maximize a global output, by adjusting the controllable inputs accordingly or providing corresponding instructions to the local process management modules. Different objective functions of the top-stage output of the system can be used in assigning credit.

DETAILED DESCRIPTION OF THE
ILLUSTRATED EMBODIMENTS

Certain embodiments of the present invention use the chain rule for ordered partial derivatives to assign credit to local process inputs of an aggregate process with a global objective. A fossil fuel power plant is a representative enterprise that will be used by way of illustration herein. It should be understood, however, that the present invention is applicable to any type of enterprise or process that represents an aggregation of processes.

Figure 1:
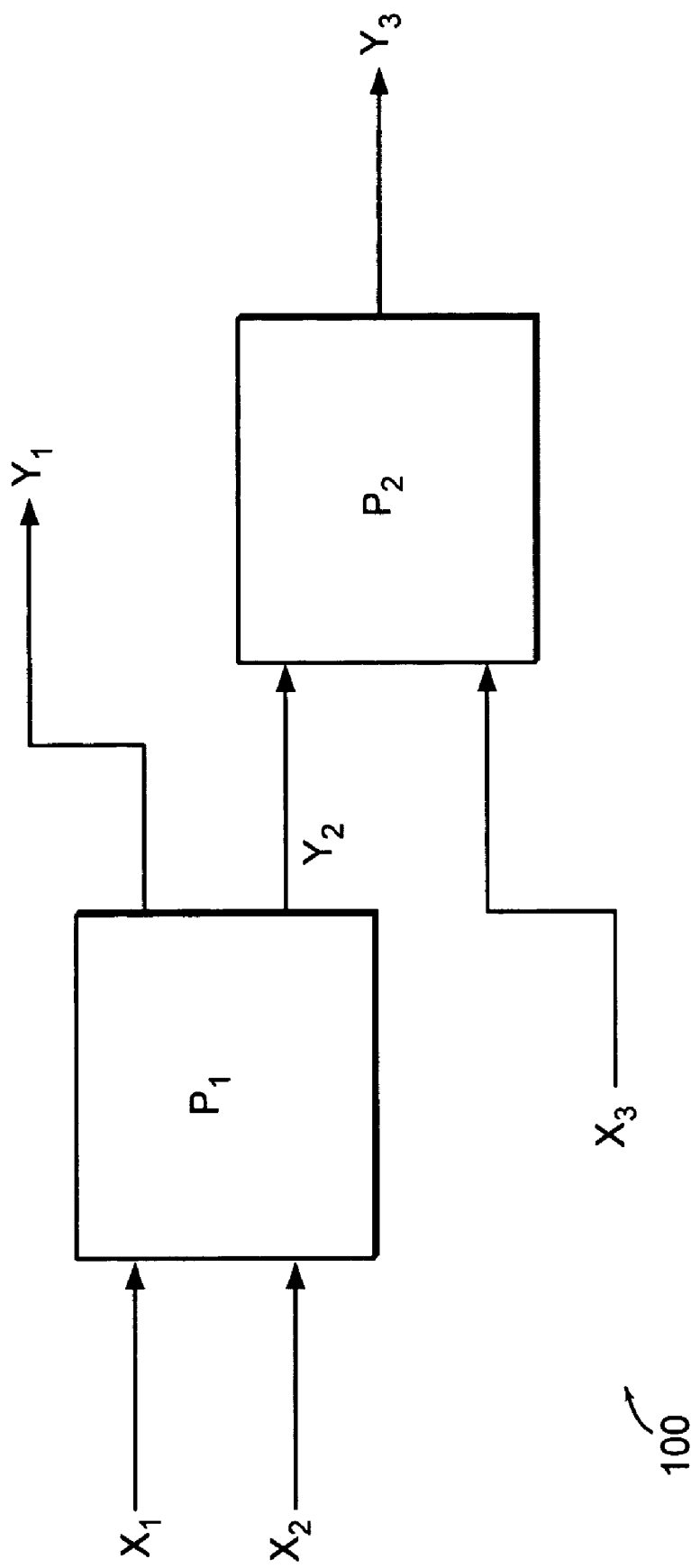
FIG. 1 is a process diagram representing a portion of an enterprise formed of a number of interconnected processes.
Figure 2:
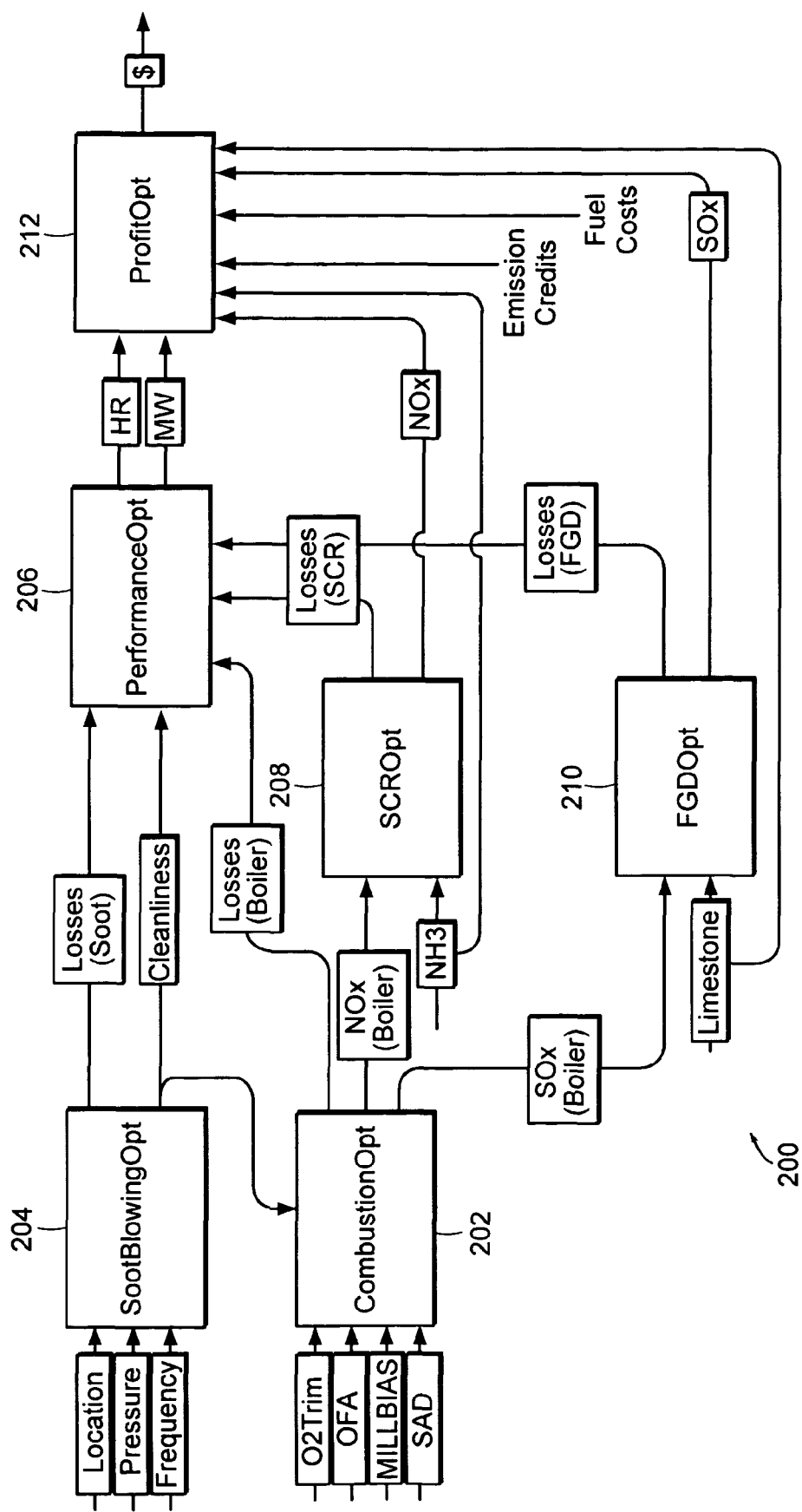
FIG. 2 is a process diagram illustrating operation of a fossil fuel power plant.

A fossil fuel power plant uses raw materials to generate power to create profit within certain constraints (e.g., regulatory requirements, power demand and fuel costs). Operating a fossil fuel power plant involves a number of complex, interdependent processes. Referring to FIG. 2, the process flow of a fossil fuel power plant 200 incorporates a number of local processes that operate to optimize localized phenomena but are interconnected with other local processes so that the process flow is hierarchical. The global output of the process flow 200 is profit, represented as $. The objective of the system is to maximize profit and the top-most process 212 in the process flow 200 calculates and optimizes profit. In this example, process flow 200 includes the following processes, all of which contribute to the $ output: combustion optimization 202, sootblowing optimization 204, performance optimization 206, SCR optimization 208, FGD optimization 210, and profit optimization 212. Combustion optimization 202 and sootblowing optimization 204 correspond to specific real physical processes, combustion and sootblowing, respectively; performance optimization 206 is a later-stage abstract process. Process flow 200 involves a complex web of input/output relationships between the variables in the system.

Combustion optimization 202 has five inputs: O2 trim, OFA, mill biases, and SAD, which are all controllable external variables, and Cleanliness, which is an output of sootblowing optimization 204. The first four variables can be set directly at a desired setpoint by a control system or operator. It will be appreciated that as the output of another process, an intermediate input like Cleanliness cannot be set directly. Cleanliness can only be adjusted by manipulating sootblowing optimization 204 using the controllable inputs for sootblowing optimization 204. Combustion optimization 202 has three local outputs: Losses (boiler), NOx (boiler) and SOx (boiler).

Sootblowing optimization 204 has three inputs: location, pressure and frequency of the sootblowing operations. These are also controllable external variables. Sootblowing optimization 202 has two outputs: Losses(soot) and Cleanliness.

SCR optimization 208 has two inputs: NOx(boiler), an output from combustion optimization 204, and NH3, an external input. SCR optimization 208 has two outputs, Losses (SCR) and NOx.

FGD optimization 210 has two inputs: SOx(boiler), an output from combustion optimization 204, and Limestone, an external input.

Performance optimization 206 has five inputs: Losses (soot) and Cleanliness, which are both intermediate or internal inputs and are chained from the outputs of sootblowing optimization 204, Losses(boiler), which is an intermediate input chained from the output of combustion optimization 204, and Losses(SCR), which is an intermediate output from SCR optimization 208, and Losses(FG), which is an intermediate output from FGD optimization 210. Performance optimization 206 has two outputs, HR and MW.

At the top of the hierarchy, profit optimization 212 has the most complex array of inputs, since all of the local processes contribute to the global objective. Profit optimization 212 has eight inputs: HR, MW, which are intermediate inputs chained to the output of performance optimization, NOx, an intermediate input chained to the output of SCR optimization, NH3, an external input, SO, an intermediate input chained to the output of FGD optimization, and Limestone, Emission Credits and Fuel Costs, which are all external inputs. The output of profit optimization 212 is the profit generated by the fossil fuel power plant. Maximizing profit is the global objective of process 200.

Figure 3:
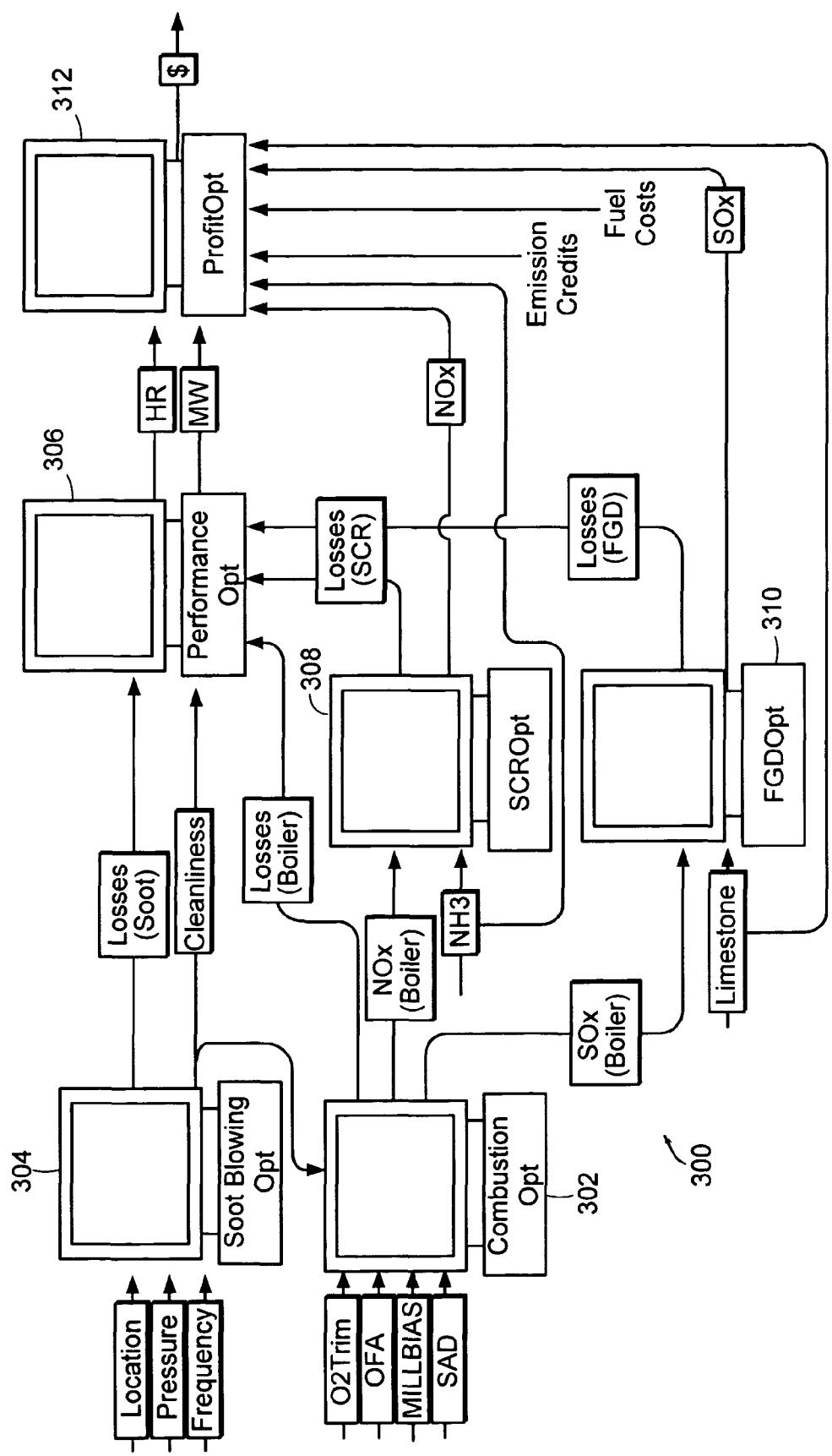
FIG. 3 is a diagram illustrating a distributed control system for a fossil fuel power plant.

As shown in FIG. 3, in the example embodiment, process flow 200 is regulated by a distributed process management system 300. Process management system 300 includes the following process management modules that implement the local processes in the fossil fuel power plant: CombustionOpt 302 for optimizing combustion, SootblowingOpt 304 for optimizing sootblowing, PerformanceOpt 306 for optimizing boiler performance; SCROpt 308 for optimizing selective catalytic reduction (SCR); FGDOpt 310 for optimizing flue gas desulfurization (FGD); and ProfitOpt 312 for optimizing the profit of the fossil fuel boiler plant. The inputs and outputs of each process management module correspond in part to the inputs and outputs of the associated local process. It will be appreciated that each process management module also has many other inputs and outputs useful to its process management functions that may not be a part of process flow 200 and are not illustrated in FIG. 3. It will be appreciated that the selected processes and division of processes and assignment of process management modules are presented by way of illustration only and not by way of limitation. A particular fossil fuel power plant may incorporate some or various combinations of the specified processes in individual process management modules. Identifying and differentiating processes and their input/output relationships in an enterprise may be straightforward or may require significant effort.

Process management system 300 is a distributed system. In the illustrated embodiment, each process management module comprises software running on a separate local processor. The local processors are interconnected over a network. The process management modules may be implemented using .NET for example. In various embodiments, each process management module has a variety of process description, data collection, control and reporting functions. A process management module may contain, for example, a model-based controller with a neural network model of its local process for controlling the local process, including equipment, inputs, etc., subject to local objectives. A model-based controller may also use a first principles model or genetic algorithm based model to represent the process. In general, a model emulates the input-output relationships of the subject process. In one contemplated embodiment, each process management module generates desired setpoints for its corresponding process based on its local objectives, or heuristics for deriving local objectives from global objectives, for its local outputs, receives instructions for operating the local process, and also resets the controllable inputs accordingly when operating in closed loop, i.e., under automated control. In certain embodiments, one function of the process management module is to assign credit to its local inputs with respect to its local outputs.

In certain contemplated embodiments, another function of the process management module is to assign credit to its local inputs with respect to the global outputs of the aggregate process. One contemplated technique for credit assignment with respect to a global output is the use of backpropagation and the chain rule for partial ordered derivatives. In certain embodiments, each process management module contains a first-order differentiable model of the corresponding process. Using backpropagated data from a later-stage process to which its outputs are chained, the process management module can calculate credit assignments for its local inputs. The process management module can backpropagate its local credit assignment calculations to other earlier-stage process management modules. When the process management modules are interconnected as in process management system 300, each process management module is able to perform credit assignment for any of its inputs with respect to any later-stage output. The process management modules may perform the credit assignment and/or communicate the credit assignment as a service to other modules.

Figure 4:
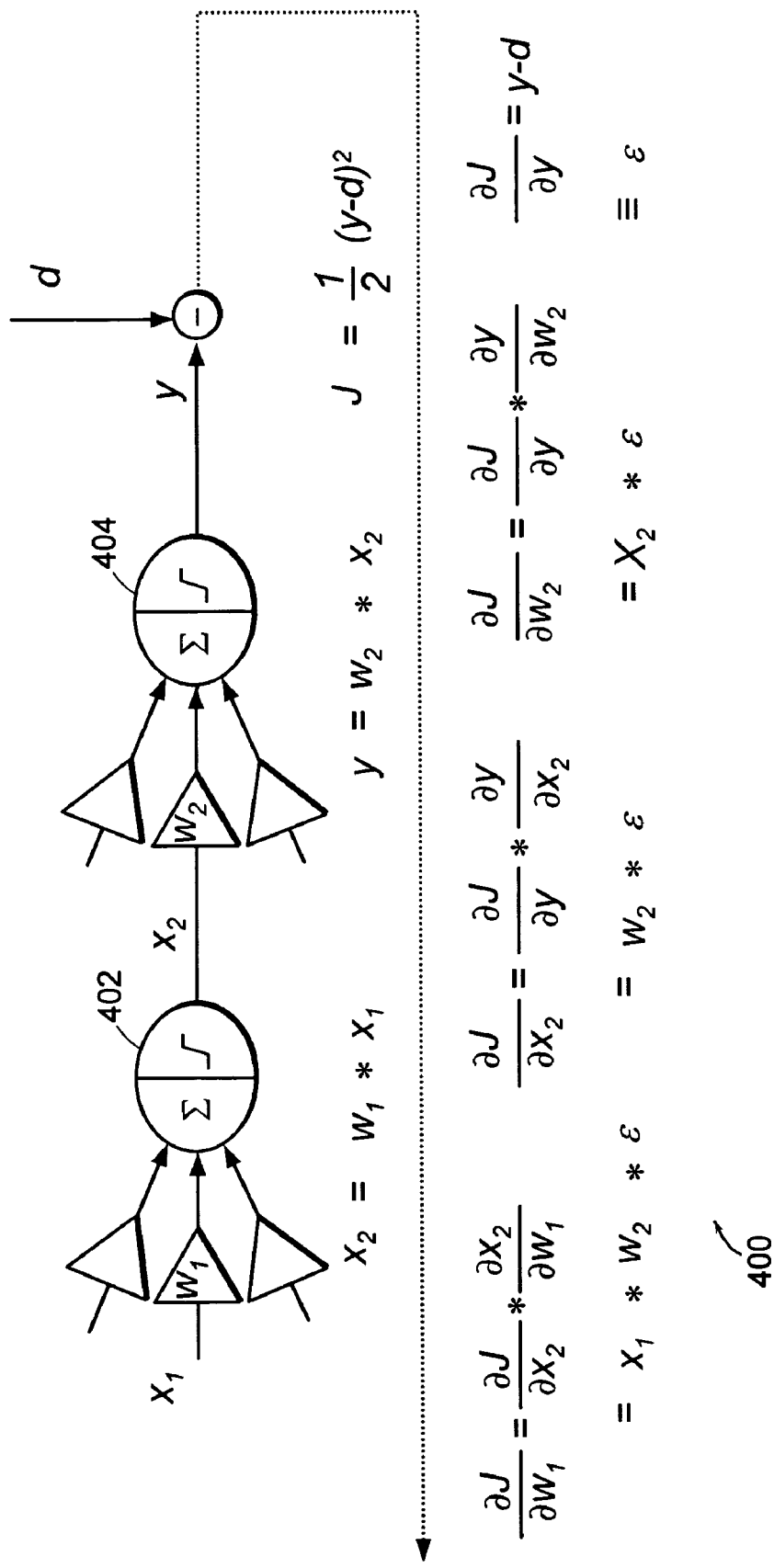
FIG. 4 is a flow diagram illustrating a method for assigning credit to local process inputs in accordance with one embodiment of the invention.

FIG. 4 illustrates generally one technique for assigning credit using the chain rule for ordered partial derivatives and backpropagation contemplated for use in embodiments of the invention. Network 400 includes two nodes 402 and 404, each of which is a simplified representation of a process. Node 402 performs a weighted summation of its inputs. For ease of illustration, node 402 is shown as having a single input x1, which is weighted by w1. Accordingly, the output is given by the following equation:

$$x2 = w1 * x1.$$

Node 404 also performs a weighted summation of its input and is also shown as having a single input x2, which is weighted by w2. Accordingly, the output is given by the following equation:

$$y = w2 * x2.$$

The output of node 404 is an input to an objective function J:

$$J = \frac{1}{2}(y - d)^2.$$

J is the objective function for which credit is to be assigned. Credit for a variable c with respect to an objective function J is denoted as $$\frac{\partial J}{\partial c}.$$

Credit is assigned to w1 and w2 by applying the chain rule and backpropagating the necessary information with respect to an earlier-stage process. The first step is to calculate $$\frac{\partial J}{\partial y}.$$

Subsequently, $$\frac{\partial J}{\partial w_2}$$

for node 404 is generated by applying the chain rule, since $$\frac{\partial J}{\partial y}$$

is known and y is a known function of w2, permitting the calculation of $$\frac{\partial y}{\partial w_2}.$$

The output x2 of node 402 is chained to the input of node 404. If the credit assignments for the chained outputs for a node are known, then credit assignment for the inputs can be calculated. Known information can be used to derive $$\frac{\partial J}{\partial x_2}.$$

Also, since x2 is a function of w1, $$\frac{\partial x_2}{\partial w_1}$$

can be calculated. Applying the chain rule, $$\frac{\partial J}{\partial w_1}$$

a can readily be determined. The result of this process is that the credits for x1, x2, w1 and w2 in this system, i.e., the impact of x1, x2, w1 and w2 on the objective function J, are now known. Accordingly, x1, x2, and possibly also w1 and w2 can be adjusted using that information. For example, if the absolute value of the credit assignment for x1 is relatively large, this information implies that a change in x1 will have a large impact on J. If the value of the credit assignment is positive, then an increase in x1 will result in a corresponding increase in J.

Figure 5:
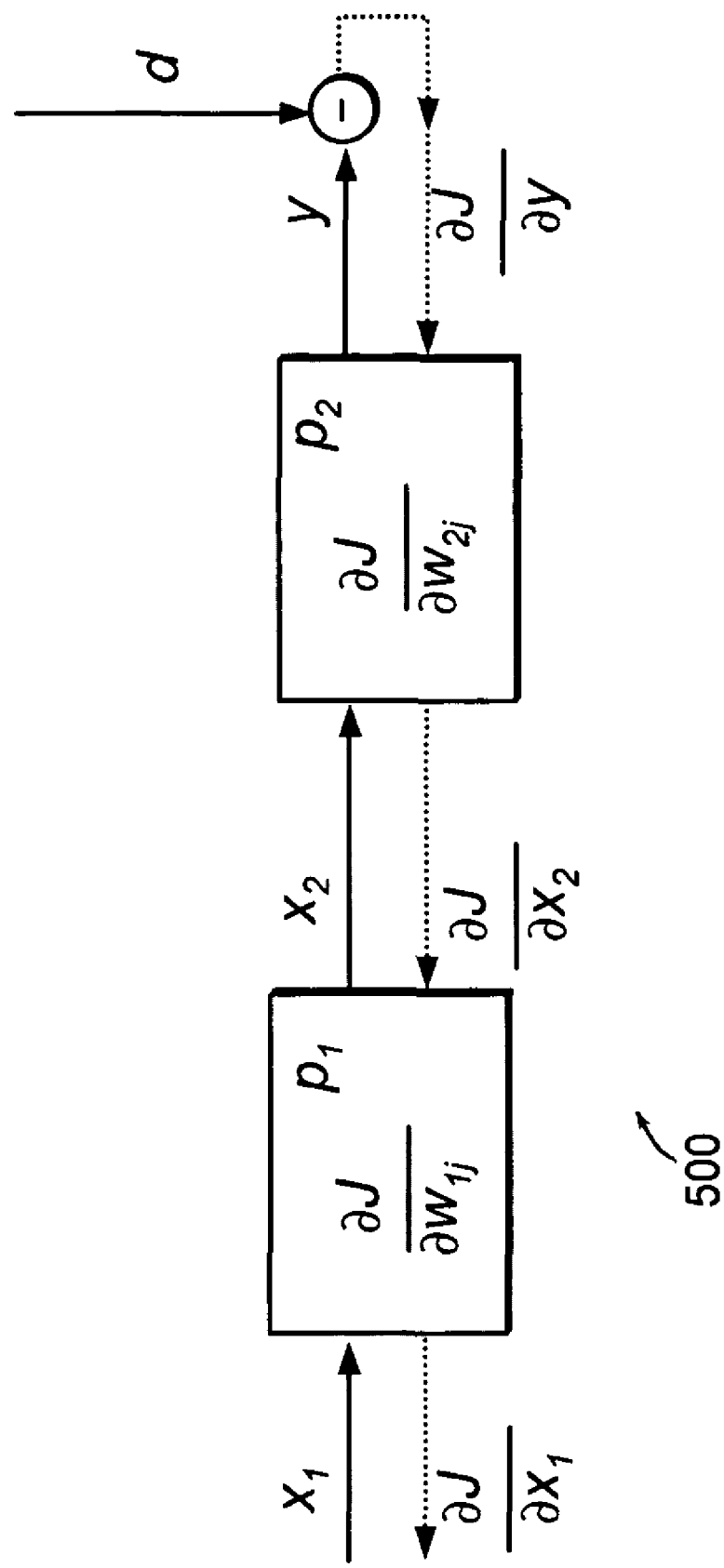
FIG. 5 is a generalized flow diagram illustrating a method for assigning credit to local process inputs in accordance with one embodiment of the invention.

FIG. 5 is a generalized representation of this technique. A system 500 comprises a first process p1 and a second process p2. Credit is to be assigned with respect to an objective function J, which may be the output of a real process or which can itself be characterized as a process.

$$\frac{\partial J}{\partial y}$$

is computed in an initial step. Subsequently, that credit assignment information can be passed back to p2 in order to determine $$\frac{\partial J}{\partial x_2}.$$

In addition, a credit $$\frac{\partial J}{\partial w_{1j}}$$

can be calculated for each of j weights associated with the process p1. In certain embodiments, these values may be used to adjust the weights. In particular, in certain embodiments, the weights may correspond to real physical properties, e.g., coefficients in a first principles model. The real physical properties of a system characterized as a process can be changed in order to change the respective weight(s) in the process. For example, if a particular type of tubing is changed, thereby changing the heat transfer properties of a functional element, the corresponding weights in the model representing that process will also change. Calculating $$\frac{\partial J}{\partial w_{1j}}$$

provides information about whether parameters in the system require adjustment and how a particular adjustment will impact the process.

In certain embodiments, the interconnected process management modules 302, 304, 306, 308, 310 and 312 use the technique illustrated in FIG. 5 to assign credit to their respective local inputs. Each process management module is treated as a processing node of a network. The credit assignment process begins with the top-most process management module in the hierarchy ProfitOpt 312. ProfitOpt 312 includes a first-order differentiable function for the $ calculation that models the profit optimization process 212. ProfitOpt 312 differentiates the first-order differentiable $ function with respect to each of its local inputs to derive credit assignment function for each of its local inputs. ProfitOpt 312 calculates the following eight credit assignments:

$$\frac{\partial \$}{\partial HR}, \frac{\partial \$}{\partial MW}, \frac{\partial \$}{\partial NOx}, \frac{\partial \$}{\partial Losses(FGD)}, \frac{\partial \$}{\partial SOx},$$

$$\frac{\partial \$}{\partial Limestone}, \frac{\partial \$}{\partial FuelCosts}, \text{ and } \frac{\partial \$}{\partial EmissionCredits}.$$

Figure 6:
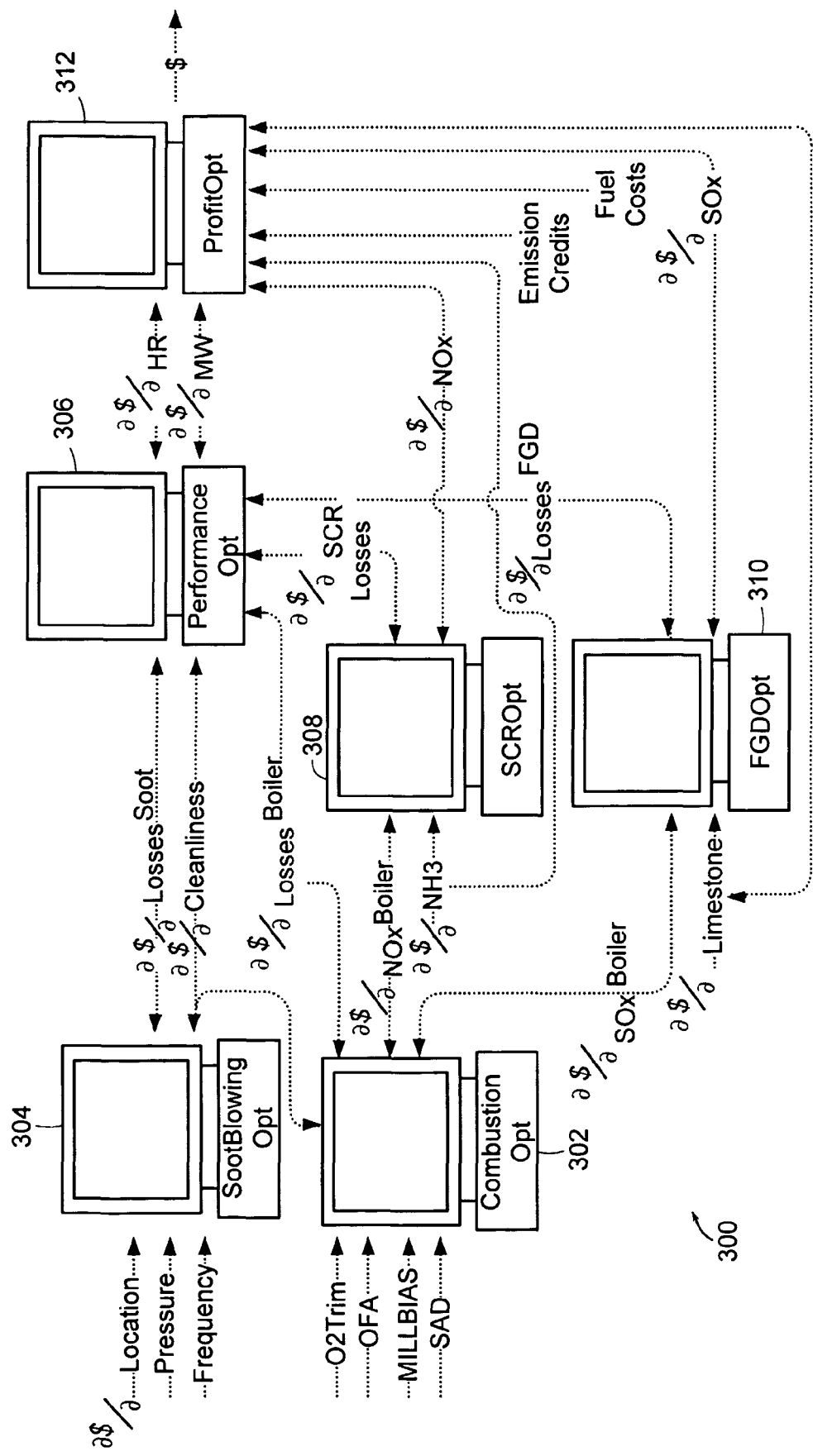
FIG. 6 is a diagram illustrating a distributed control system for a fossil fuel power plant.

Using collected output measurements and input data, ProfitOpt 312 substitutes the values into the credit assignment functions to calculate the real-time credits for each one. ProfitOpt 312 also provides the credit assignments, if appropriate, and calculated credits to all of the modules from which its inputs are chained, PerformanceOpt 306, SCROpt 308, and FGDOpt 310. These modules in turn use the backpropagated data to calculate credit assignments for each of their local inputs with respect to the $ output using the chain rule for ordered partial derivatives. The differentiation and backpropagation steps are continued until credit assignments have been derived for all of the inputs to the process flow 200 in the process management system 300, as shown in FIG. 6. Data collected from the operation of the plant can be substituted into the derived credit assignments to calculate real-time credit for each local input as desired. Accordingly, the credits can be continuously reassigned and monitored in real time, whenever new data is collected and transmitted to each process management module.

One further advantage of this method is that a global credit assignment can be readily computed for any single input that is provided to multiple processes. The global credit assignment calculation for that input for each respective process generates a partial credit assignment with respect to the global output. The partial credit assignments can be summed to obtain the global credit assignment for that input. Complex interrelationships can conveniently be taken into account.

The credit assignment for a given variable should be updated at least when (1) the applicable first-order differentiable model of the local process is changed, for example by substitution or modification or (2) any backpropagated credit assignment data used in calculating the credit assignment function is modified, i.e., typically when the first-order differentiable representation of a later-stage process is modified. The first-order differentiable representation of a process can change for a number of reasons, for example, a change in the operating region of a particular process, retraining of an adaptive model, or a physical change in the corresponding process. Accordingly, in certain contemplated embodiments the process management modules provide regular updates and notifications to other process management modules of the necessary information. A process management module can request credit assignment information from other modules; correspondingly, a process management module can perform credit assignment as a service to other process management modules.

In contemplated embodiments, an integration module integrates data from the various process management modules. Standard application program interfaces (APIs) allow the various local process management modules to communicate with each other and with an enterprise-stage manager. One feature of the integration module is an interface for displaying the credit assignments of the inputs in the process flow 200. In one embodiment, illustrated in FIG. 7, the interface 700 displays the credit assignments as sensitivities of the profit to each controllable variable in real time. The sensitivity of the profit to a particular variable is directly related to the credit assigned to the variable, i.e., if the credit assigned to a variable is large, then the sensitivity of the profit with respect to that variable will also be high. A small change in the variable setting will result in a disproportionately large impact on the profit. In the interface 700, the sensitivity is illustrated as a continuously varying bar. The bar increases when the $ output is more sensitive to the respective variable and decreases when the $ output is less sensitive to the respective variable. While all of the sensitivities illustrated in the exemplary screen of interface 700 are positive, sensitivities may also be negative. A negative sensitivity indicates that a positive change in the variable will yield a negative change on the profit. Interface 700 quickly and conveniently allows an operator to understand the impact of various variables and adjustments to them on the global output. Process management system 300 permits an operator to understand and control the local processes so that the overall plant objective of maximizing profit can be accomplished. A local display can also be provided corresponding to individual process management modules.

In embodiments of the invention, a process management module typically has a one-to-one correspondence with a logical unit or node in a directed graph that models the relevant aggregate process. A typical process management module is a local entity in that it models the input and output relationships of a single, specific process. In contemplated embodiments, a process management module is comprised of software that executes on one or more computers. As used herein, a computer is generally understood to be a networked data processing system with a Media Access Control (MAC) address or comparable address (e.g., Ethernet address, hardware address, physical address, PHY address), which is typically located in a network interface card (NIC) or other physical-layer network device within the data processing system. In contemplated embodiments, the combination of one or more computers on which a single process management module runs defines a process management computer. In various embodiments, the individual components of a process management computer may be located on the same Local Area Network (LAN) or may be located on multiple LANs. LANs are connected to high-speed corporate backbones via a bridge or firewall or directly to a Wide-Area Network (WAN), the Internet, or some other network via routers or other Ethernet switches. Placing the components of a process management computer on a single LAN facilitates computation, for example; but in some cases, it may be necessary to spread a single process management computer across multiple LANs. For instance, security policies at power or chemicals production facilities frequently require the use of network firewalls or gateways that restrict communications to and from control computers. A process management computer that has one or more components on both sides of such a firewall or gateway could therefore span multiple LANs. In certain contemplated embodiments, LAN architectures are typically Internet Protocol (IP) based, such as IP token bus, IP token ring, or IP Ethernet, though others may be used.

In certain contemplated embodiments, only one process management module typically runs on one process management computer. Information propagation between two process management modules therefore involves accessing the network that connects two process management computers. Depending on the configuration of the system and the location of the process management computers, communication between process management modules may require propagation of information over LANs, WANs, domains, subnets, or other physical or logical network boundaries or delineators. Communication between process management modules may therefore pass through one or more firewalls, bridges, routers, layer 2 switches, or other Ethernet switch devices.

Figure 8:
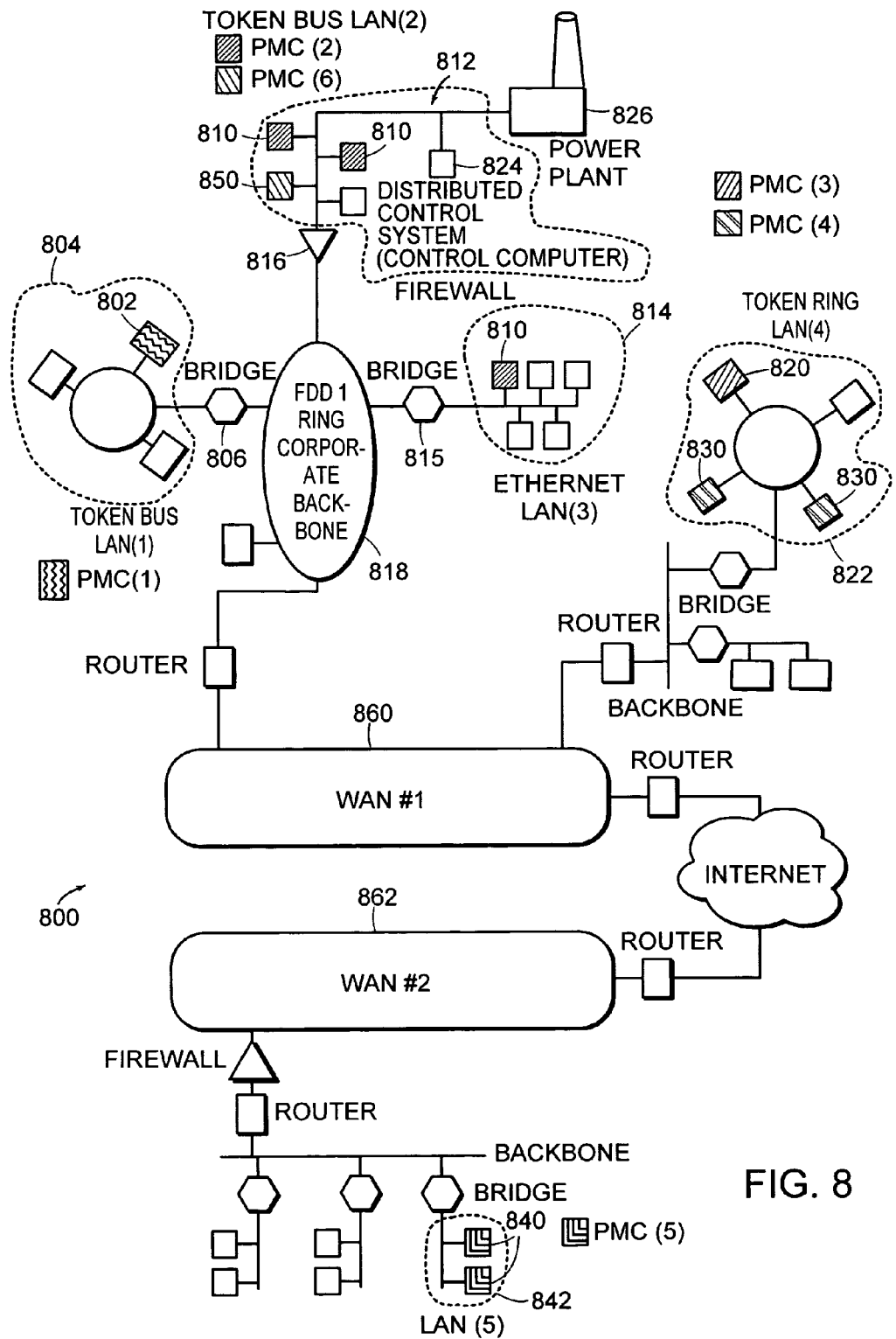
FIG. 8 is a network diagram of a corporate computer network for a representative enterprise.

An exemplary network architecture, in which embodiments of the present invention may be implemented, is illustrated in FIG. 8, which is a network diagram of a distributed enterprise management system 800 for a power company. Enterprise management system 800 is a complex network that includes a number of process management modules, running on respective process management computers. The process management computers are distributed across multiple LANs that are interconnected by WANs, the Internet, and other network elements. As shown in FIG. 8, a first process management computer 802 composed of a single machine runs a first process management module. Process management computer 802 is located on a Token Bus LAN 804, which is accessed via a bridge 806, and connects to a Fiber Distributed Data Interface (FDDI) Ring 818, which is a component of the corporate network backbone. Process management computer 810 is distributed across two LANs, and includes two computers on a first LAN 812 and one computer on a second LAN 814. LAN 812, which is a token bus LAN, is protected by a firewall 816 and LAN 814 is connected via a bridge 815 to FDDI Ring 818. LAN 812 requires controlled access protection provided by firewall 816 because distributed control system (DCS) 824, via which power plant 826 is operated, is a secure system. A third process management module runs on a third process management computer 820. A fourth process management module runs on a fourth process management computer 830, which is distributed across two computers located on LAN 822. A fifth process management module runs on a fifth process management computer 840, which is distributed across two computers on a single LAN 842. A sixth process management module runs on a sixth process management computer 850, which runs on LAN 812. By way of illustration of the complexity of an enterprise-wide network, WANs_860 and 862_may include T1 and multiplexed T lines, SONET (STS or OC) lines, dial-up ISDN connections, virtual private networks (VPN), wireless networking using cell-based technologies, DSL services, etc.

It is desirable to aggregate and to disaggregate the data collected and calculated by the individual process management modules on their respective process management computers. Information propagation between the process management modules requires accessing one or more networks, and in certain cases, traversing one or more physical or defined network boundaries. Information transmission between process management computers 802, 810 and 850, all of which are located off of the FDDI high-speed corporate backbone involves transmissions within a LAN, across a bridge, across a firewall, and across the corporate backbone. In contrast, process management computers 820 and 830 can communicate exclusively within-LAN. But in order to access process management computers 802, 810, 840 and 850, process management computers 820 and 830 must communicate further through routers, firewall and bridges, across-WAN, etc., traversing a number of network boundaries.

One advantage of the invention is the ability to aggregate data from the distributed process management modules using discrete data points. In the illustrated embodiment, each process management module operating in network 800 includes a service for computing the credit of its respective inputs in the global output of the enterprise, which is profit. An earlier-stage process management module requests and receives the global credit assignments of each of its chained outputs from the respective process management module to which each output is chained. For example, if the earlier-stage process management module is the process management module running on process management computer 810, and the later-stage process management module is the process management module running on process management computer 840, process management computer 810 requests credit assignment data from process management computer 840. The request and the responsive data must be transmitted across FDDI ring 818, WAN 860, the Internet and WAN 862. The process management module running on process management computer 810 applies the chain rule using the later-stage credit assignment data received from process management computer 840 to obtain the global credit assignments for its inputs. The process management module can then transmit its calculated global credit assignments as needed, or in response to requests from other process management modules. For example, if the process management module running on process management computer 820 is at an earlier stage than the process management module running on process management computer 810, and the two corresponding processes are directly linked in the process flow, then process management computer 810 may transmit its global credit assignments to process management computer 820 automatically whenever they are recomputed. The process can be repeated iteratively throughout the hierarchy of the process management modules to derive the credit assignments for all of, or a desired subset of, the inputs for the enterprise-wide system.

In an alternate embodiment, more than one process management module may execute on a single process management computer. This embodiment may be used when a single process management computer has exceptional computing, memory, and disk resources and is therefore capable of processing multiple process management modules without detrimentally impacting overall performance. Such an embodiment can be implemented using a number of hardware architectures, including architectures that support parallel processing, such as Symmetric Multi Processing (SMP) or Massively Parallel Processing (MPP). These architectures allow a second or greater process, such as a process management module, to run at the same time and on the same process management computer as a first process, such as another process management module, without detrimentally impacting the performance of the first process. In certain contemplated embodiments, enterprise optimization, using backpropagation of credit assignments, does not require larger inter-process or inter-process management module communication. A single process management module typically transmits a small volume of information to other process management modules. In certain embodiments, the performance is contemplated to be limited by the processing and/or memory capacity of the computer. Accordingly, in many embodiments, a single process management computer may be composed of one SMP, with multiple CPUs and fast memory access and dedicated to running only a single process management module.

It should be understood that the term "backpropagation" as used herein does not necessarily refer to a particular directional or physical propagation of data from one process management module to another, but a computational one. The computational backpropagation may or may not entail a physical "backpropagation" of data over a network. In certain cases, the computational backpropagation may entail a "forward propagation" of data over a network. In certain cases, a particular process management module may transmit its local information to another process management module, or to a centralized or regional enterprise manager, where some or all of the global credit assignments for particular local inputs are calculated centrally using data that is mathematically back-propagated from calculations for later-stage processes to be applied with respect to earlier-stage processes.

Figure 7:
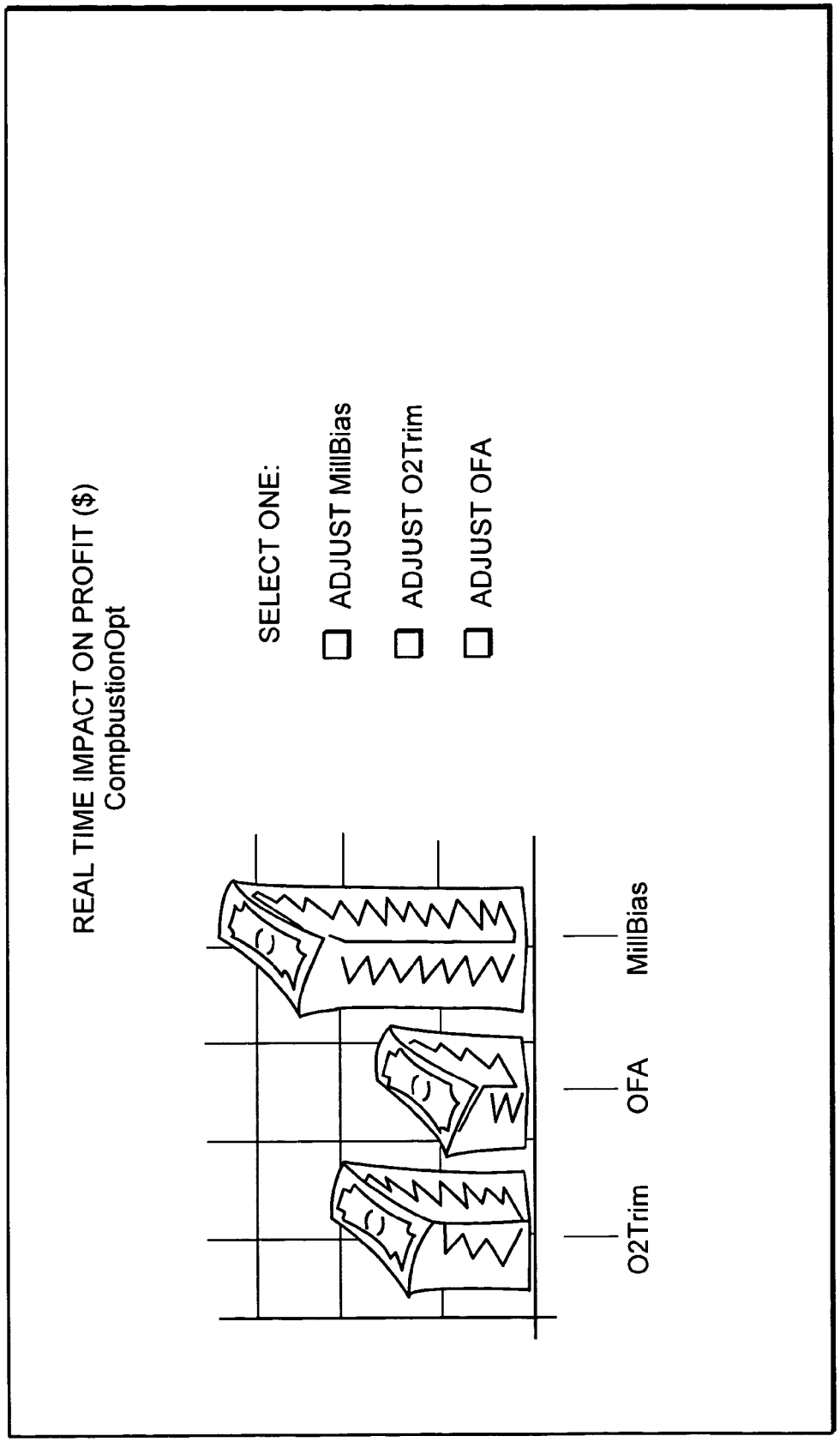
FIG. 7 is an illustration of an interface displaying the sensitivity of the profit to various inputs to the fossil fuel power plant in real time.
Figure 9:
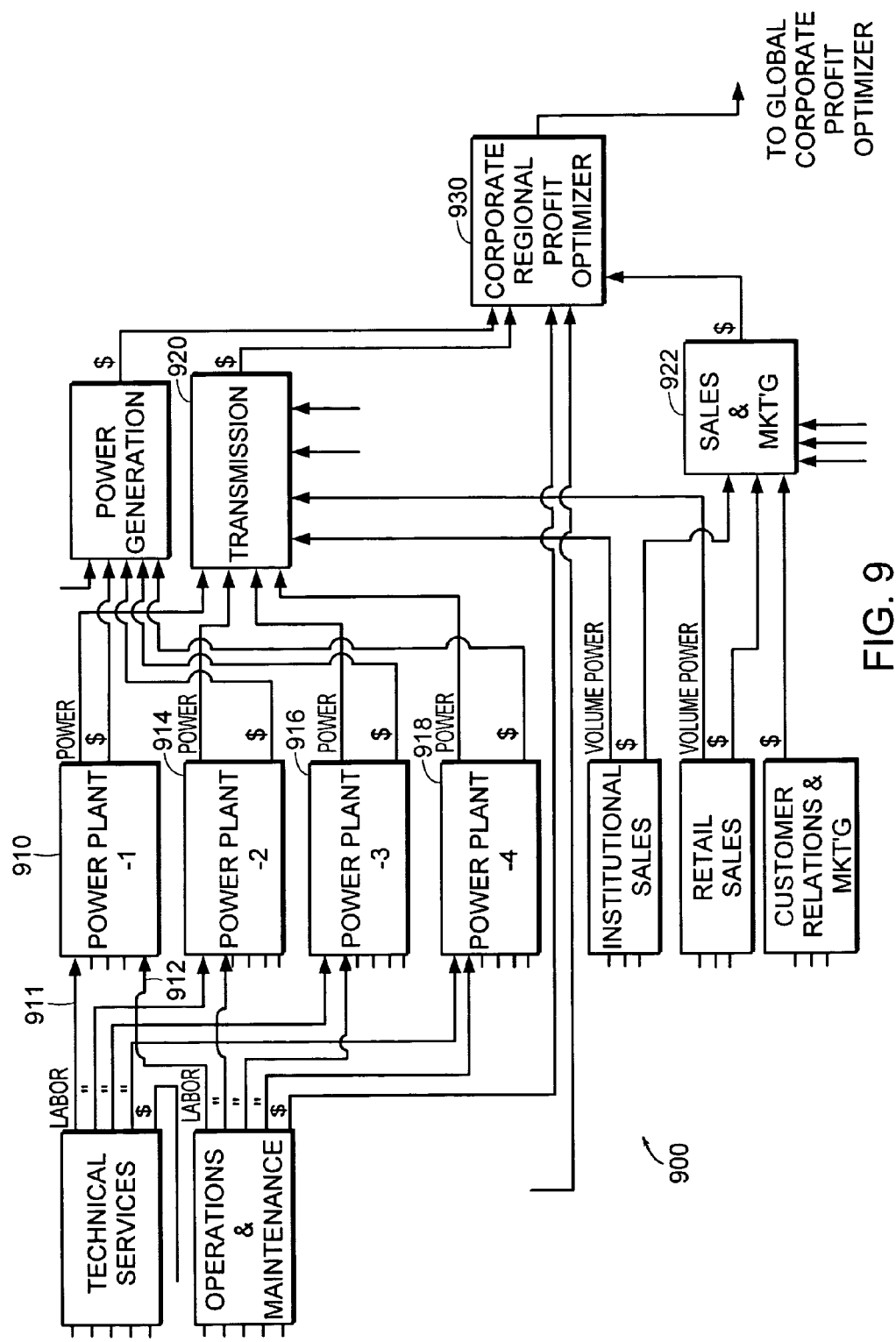
FIG. 9 is a process optimization flow diagram for a portion of a power generation enterprise.

Embodiments of the present invention include applications in a number of industries, such as oil refining, chemicals, pharmaceuticals, foods, pulp and paper, power and utilities, semi-conductor manufacturing, mining, ore processing, telephone and data transmission, natural gas pipeline transportation, production line assembly. In general, embodiments of the present invention are useful for linking information from disparate and distributed local processes at many levels. One embodiment has been described above in the context of a single power plant, which itself may constitute or be treated as an enterprise that can be evaluated and understood in terms of multistage enterprise optimization using backpropagation. FIG. 9 illustrates how a power plant fits within a larger power generation enterprise and within a total enterprise optimization scheme. Enterprise optimization structure 900 includes a number of blocks, each of which represents the local optimization of one or more processes involved in the calculation of the enterprise's profitability. In FIG. 9, block 910 represent the power plant having the exemplary process flow shown in FIG. 2. In FIG. 9, the sum of inputs to a power plant 910 is representative of the external inputs into the exemplary process flow shown in FIG. 2. Additional inputs 911 and 912 to power plant 910 in FIG. 9 indicate the input from corporate divisions external to power plant 910, namely Technical Services and Operations and Maintenance. The outputs from power plant 910 are representative of the outputs from the previously described process management module 312. The outputs from power plant 910 include both profitability, measured in dollars, and net power production, measured in Megawatts. The inputs and outputs of three other power plants 914, 916, 918 are also shown in FIG. 9. Some of the blocks represent geographically local processes, such as process 200, while others of the blocks represent logically discrete processes that are geographically distributed, such as transmission. The Transmission block 920 represents the optimization of a single corporate entity, the division responsible for managing the transmission of electricity across wires to and from other independent system operators (ISOs), providers, consumers, producers, etc. Other blocks, such as the Sales and Marketing block 922, represent the optimization of a process that is distributed across a large geographic extent, but which is a single centralized, discrete corporate entity with a "local" notion of optimization. The optimization represented by Sales and Marketing block 922 represents the optimization of the Sales and Marketing Division of the Corporation. A process optimization block may therefore represent actual corporate entities. It is typically desirable to represent the entire entity and its relative impacts on the enterprise in one concise and bounded object as shown symbolically in FIG. 9. In the process optimization flow of FIG. 9, the terminal stage is Regional Corporate Profit Optimizer block 930. The process optimization flow representation provides a conceptual basis for handling process management tasks and for generating local and global credit assignments for system inputs. In contemplated embodiments, the user interface includes a graphical representation of the process optimization flow to provide a human user with convenient access to the enterprise optimization information. The graphical representation may closely resemble the process optimization flow shown in FIG. 9. In certain embodiments, each block can be clicked to allow a user to drill down to the desired level of specificity. The user can click on specific inputs to view a specific credit assignment, as shown in FIG. 7.

Figure 10:
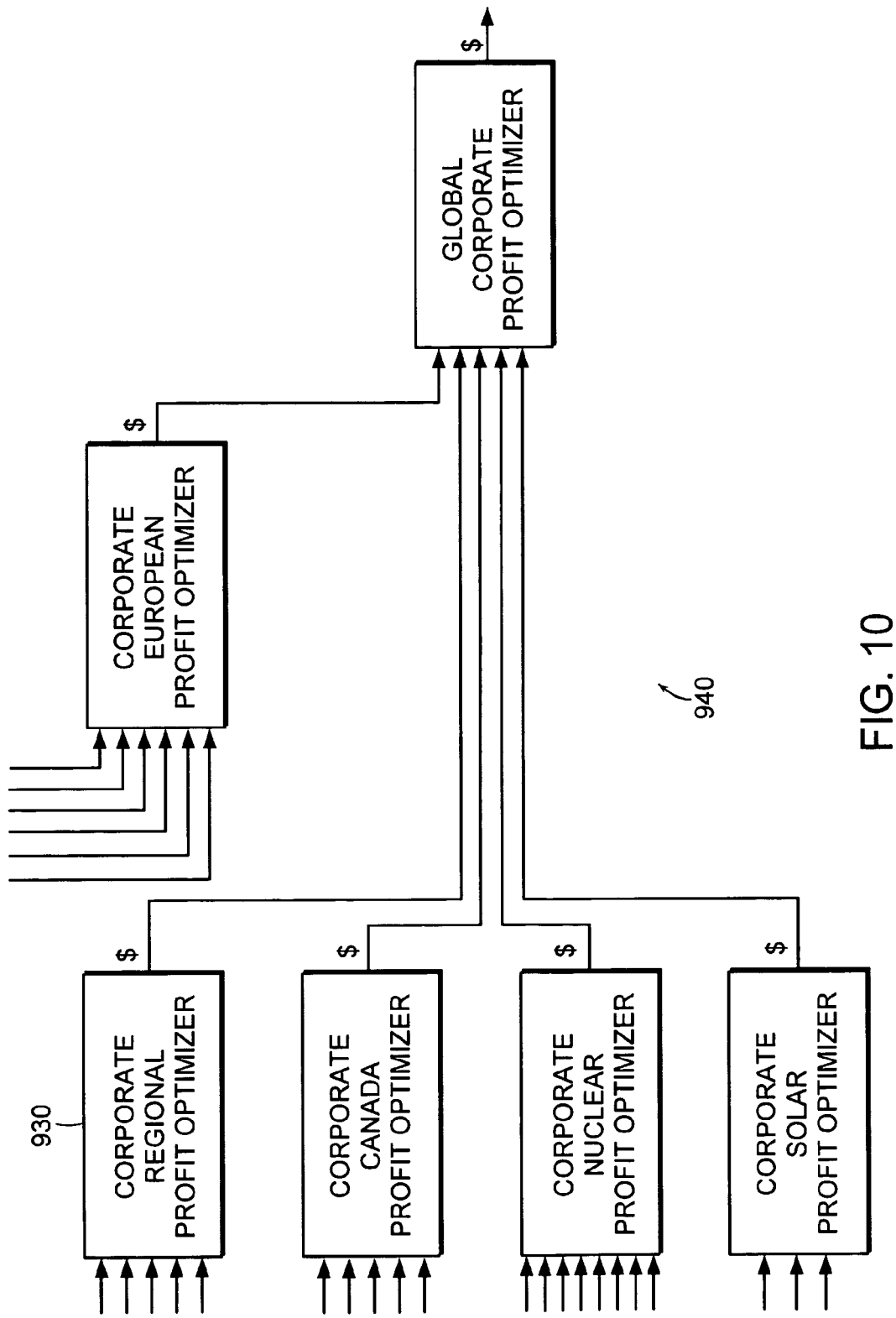
FIG. 10 is process optimization flow diagram for a later-stage portion of the power generation enterprise of FIG. 9.

FIG. 10 shows the process optimization flow 940 of the same enterprise at later stages than in FIG. 9. As with respect to process optimization flow 900, some blocks represent relatively geographically local corporate processes crucial to profit optimization, while other block represent relatively geographic distributed corporate entities that are local only in the sense of corporate management or expertise.

Figure 11:
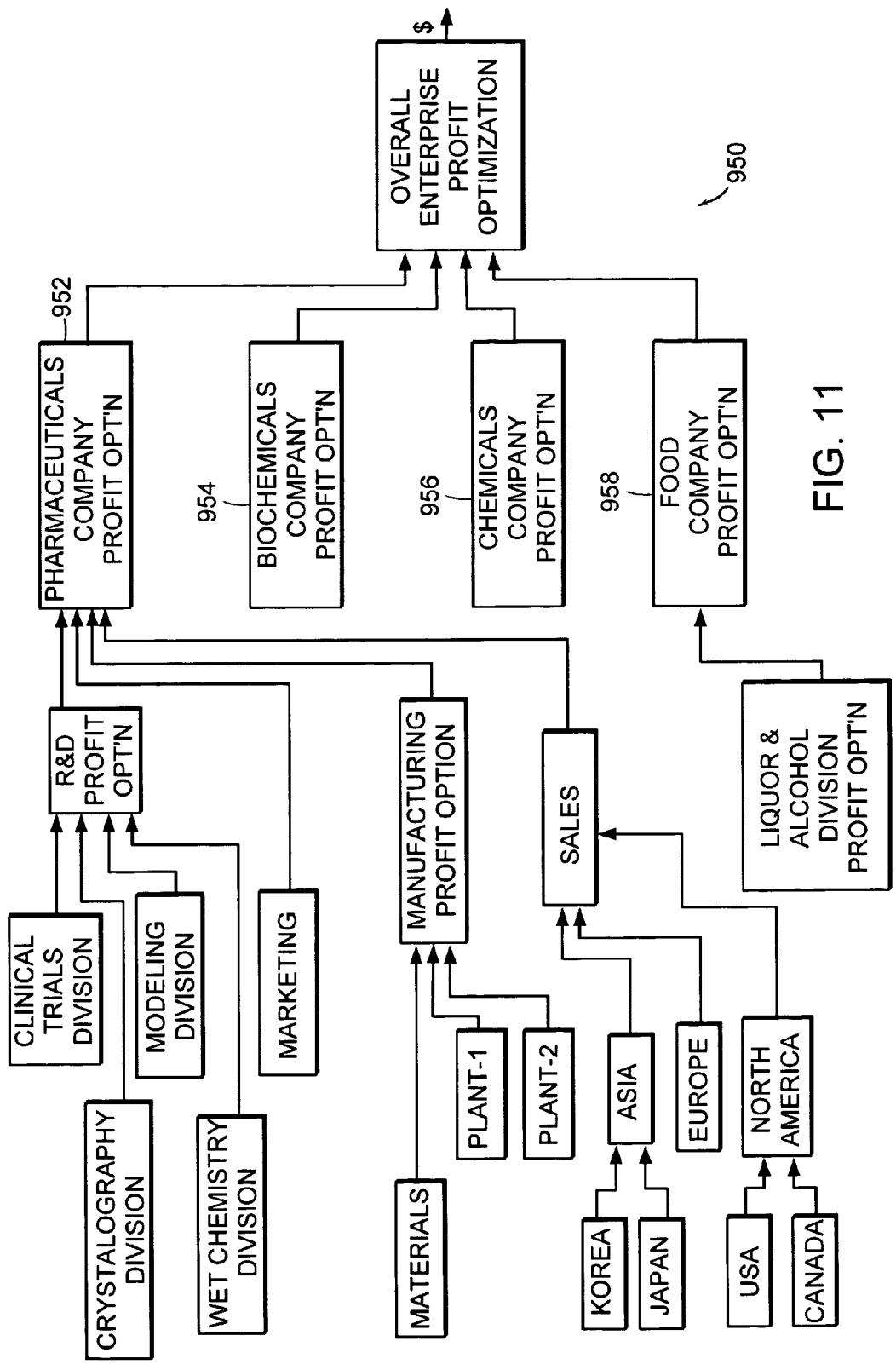
FIG. 11 is a process optimization flow diagram for a portion of a multi-division enterprise.

FIG. 11 shows the process optimization flow 950 of an enterprise that is composed of four major entities 952, 954, 956, 958 specializing in pharmaceuticals, biochemicals, chemical, and foods respectively. Using the techniques and apparatuses described above, each of the four companies mathematically represents and numerically models the sensitivity of its profit to the various inputs to that entity. The sensitivity of the global profit objective with respect to each of the local input variables of each of the entities may then be calculated using the methods of backpropagation. The number of local processes contained within each illustrated process and details of the process optimization representation can be configured to represent any and all information available about the process and affecting profitability, or any other desired objective.

The systems and methods disclosed herein and incorporated in various embodiments of the invention offer a number of advantageous features. The plant can be viewed as a whole and adjustments can be prioritized according to the most sensitive controllable factors. The method used by process management system 300 is readily scalable, in part because the credit assignment computations are distributed.

While the present invention has been illustrated and described with reference to preferred embodiments thereof, it will be apparent to those skilled in the art that modifications can be made and the invention can be practiced in other environments without departing from the spirit and scope of the invention, set forth in the accompanying claims.

What is claimed is:

1. A method for assigning a profit contribution value to a first input of a first process for operation of the fossil fuel power plant in a network comprised of a plurality of interconnected process management modules respectively associated with processes for operation of a fossil fuel power plant, the profit contribution value indicative of a contribution of the first input to a global output of the network, wherein the global output is a profit generated by operation of the fossil fuel power plant, the first process having a plurality of inputs and outputs, at least one of said outputs of the first process being a chained output that is an input to a second process for operation of the fossil fuel power plant and contributes to the global output of the network, the method comprising:
  obtaining profit contribution values for assignment to each of the chained outputs of the first process for operation of the fossil fuel power plant with respect to the global output, wherein the profit contribution values assigned to each of the chained outputs of the first process are a measure of the contribution of the chained outputs on the global output;
  using a model-based controller having a first-order differentiabte model of the first process to derive a local contribution value for assignment to the first input of the first process, wherein the local contribution value assigned to the first input is a measure of the contribution of the first input on outputs of the first process; and using a local processor to apply a chain rule for ordered partial derivatives using (a) the first-order differentiable model of the first process, (b) the local contribution value assigned to the first input, and (c) the profit contribution values assigned to the chained outputs of the first process in order to assign the profit contribution value to the first input of the first process.

2. The method of claim 1, wherein the first-order differentiable model is a neural network.

3. The method of claim 1, wherein the first-order differentiable model is a first-principles model.

4. The method of claim 1, wherein the method includes managing the first process using a first process management module and determining the profit contribution value assigned to the first input using the first process management module.

5. The method of claim 1, further comprising:
  managing the first process using a first process management module;
  transmitting the local contribution value over the network, from the first process management module, to a second process management module, wherein the second process management module computes the profit contribution value assigned to the first input.

6. A computer program product stored on a computer readable medium for use in analyzing a first process for operation of a fossil fuel power plant, the first process having a plurality of inputs and at least one output, at least one of said outputs being a chained output that is an input to a second process in a network of process management modules respectively associated with processes for operation of the fossil fuel power plant, and contributes to a global output of the network, wherein the global output is a profit generated by operation of the fossil fuel power plant, the computer program product containing instructions for causing a computer to:

obtain profit contribution values for assignment to each of the chained outputs of the first process for operation of the fossil fuel power plant with respect to the global output using an application program interface, wherein the profit contribution values assigned to each of the chained outputs of the first process are a measure of the contribution of the chained outputs on the global output;

obtain a first-order-differentiable model of the first process; and apply a chain rule for ordered partial derivatives to the first-order-differentiable model using the profit contribution values assigned to each of the chained outputs of the first process to determine a profit contribution value assigned to a first input of the first process with respect to the global output of the network, wherein the profit contribution value assigned to the first input is a measure of the contribution of the first input on the global output.

7. The computer program product of claim 6, wherein the first-order-differentiable model is a neural network.

8. The computer program product of claim 6, wherein the first-order-differentiable model is a first-principles model.

9. The computer program product of claim 6, wherein the first-order-differentiable model is changed due to (a) a change in operating region of the first process, (b) retraining of the model, or (c) a physical change in the first process.

10. The method of claim 1, wherein said first and second processes for operation of the fossil fuel power plant are selected from the group consisting of the following processes: combustion optimization, sootblowing optimization, boiler performance optimization, selective catalytic reduction (SCR) optimization, flue gas desulfurization (FGD) optimization, and profit optimization.

11. The method of claim 1, wherein the first process is combustion optimization, said first input of the first process is selected from the group consisting of: $O_2$ trim, over fire air (OFA), mill biases, SAD, and cleanliness; and an output of the first process is selected from the group consisting of: boiler losses, boiler NOx and boiler SOx.

12. The method of claim 1, wherein the first process is sootblowing optimization, said first input of the first process is selected from the group consisting of: location, pressure and frequency of sootblowing operations; and an output of the first process is selected from the group consisting of soot losses and cleanliness.

13. The method of claim 1, wherein the first process is SCR optimization, said first input of the first process is selected from the group consisting of: boiler NOx and $NH_3$; and an output of the first process is selected from the group consisting of: SCR losses and NOx.

14. The method of claim 1, wherein the first process is FGD optimization, said first input of the first process is selected from the group consisting of: boiler SOx and limestone; and an output of the first process is selected from the group consisting of: FGD losses and SOx.

15. The method of claim 1, wherein the first process is boiler performance optimization, said first input of the first process is selected from the group consisting of: soot losses, cleanliness, boiler losses, SCR losses and FGD losses; and an output of the first process is selected from the group consisting of: heat rate (HR) and MW.

16. The method of claim 1, wherein the method includes managing the first process using a first process management module, the first management module selected from the group consisting of: a module for optimizing combustion; a module for optimizing sootblowing; a module for optimizing boiler performance; a module for optimizing selective catalytic reduction (SCR); and a module for optimizing flue gas desulfurization (FGD).

17. The method of claim 1, wherein said processes of the process management modules include a third process having a plurality of inputs and an output that is said global output of the network, wherein the third process is profit optimization.

18. The method of claim 17, wherein an input of said third process is selected from the group consisting of: heat rate (HR), MW, NOx, $NH_3$, SO, limestone, emission credits, and fuel costs.

19. The computer program product of claim 6, wherein said first and second processes of the fossil fuel power plant are selected from the group consisting of the following processes: combustion optimization, sootblowing optimization, boiler performance optimization, selective catalytic reduction (SCR) optimization, flue gas desulfurization (FGD) optimization, and profit optimization.

20. The computer program product of claim 6, wherein the first process is combustion optimization, said first input of the first process is selected from the group consisting of: $O_2$ trim, over fire air (OFA), mill biases, SAD, and cleanliness; and an output of the first process is selected from the group consisting of: boiler losses, boiler NOx and boiler SOx.

21. The computer program product of claim 6, wherein the first process is sootblowing optimization, said first input of the first process is selected from the group consisting of: location, pressure and frequency of sootblowing operations; and an output of the first process is selected from the group consisting of: soot losses and cleanliness.

22. The computer program product of claim 6, wherein the first process is SCR optimization, said first input of the first process is selected from the group consisting of: boiler NOx and $NH_3$; and an output of the first process is selected from the group consisting of: SCR losses and NOx.

23. The computer program product of claim 6, wherein the first process is FGD optimization, said first input of the first process is selected from the group consisting of: boiler SOx and limestone; and an output of the first process is selected from the group consisting of: FGD losses and SOx.

24. The computer program product of claim 6, wherein the first process is boiler performance optimization, said first input of the first process is selected from the group consisting of: soot losses, cleanliness, boiler losses, SCR losses and FGD losses; and an output of the first process is selected from the group consisting of: heat rate (HR) and MW.

25. The computer program product of claim 6, wherein the first process is managed by a first process management module, wherein the first management module is selected from the group consisting of: a module for optimizing combustion; a module for optimizing sootblowing; a module for optimizing boiler performance; a module for optimizing selective catalytic reduction (SCR); and a module for optimizing flue gas desulfurization (FGD).

26. The computer program product of claim 6, wherein a third process having a plurality of inputs and an output that is said global output of the network, wherein the third process is profit optimization.

27. The computer program product of claim 26, wherein an input of said third process is selected from the group consisting of: heat rate (FIR), MW, NOx, $NH_3$, SO, limestone, emission credits, and fuel costs.

* * * * *